(12) United States Patent
Weis et al.

(10) Patent No.: US 10,619,604 B2
(45) Date of Patent: Apr. 14, 2020

(54) LINEAR ACTUATOR

(71) Applicant: CONTINENTAL AUTOMOTIVE GMBH, Hannover (DE)

(72) Inventors: Christian Weis, Budenheim (DE); Carsten Mikolajek, Griesheim (DE)

(73) Assignee: Continental Automotive GmbH, Hannover (DE)

( * ) Notice: Subject to any disclaimer, the term of this patent is extended or adjusted under 35 U.S.C. 154(b) by 309 days.

(21) Appl. No.: 15/499,258

(22) Filed: Apr. 27, 2017

(65) Prior Publication Data

US 2017/0226969 A1 Aug. 10, 2017

Related U.S. Application Data

(63) Continuation of application No. PCT/EP2015/075460, filed on Nov. 2, 2015.

(30) Foreign Application Priority Data

Nov. 3, 2015 (DE) .................. 10 2014 222 413

(51) Int. Cl.
  *F02M 26/67* (2016.01)
  *F16K 31/52* (2006.01)
  *F16K 31/53* (2006.01)
  *F16H 37/12* (2006.01)
  *F16H 25/18* (2006.01)
  *F02M 26/54* (2016.01)
  *F16H 19/00* (2006.01)
  (Continued)

(52) U.S. Cl.
  CPC ............ *F02M 26/67* (2016.02); *F02M 26/54* (2016.02); *F16H 19/001* (2013.01); *F16H 25/18* (2013.01); *F16H 37/12* (2013.01); *F16H 53/06* (2013.01); *F16K 31/524* (2013.01); *F16K 31/52408* (2013.01); *F16K 31/53* (2013.01)

(58) Field of Classification Search
  CPC ...... F16H 19/001; F16H 31/524; F16H 37/12; F16H 25/18; F16H 53/06; F02M 26/67
  See application file for complete search history.

(56) References Cited

U.S. PATENT DOCUMENTS 3,344,685 A * 10/1967 Crouzet ............. B65H 54/2812
                                                          74/56
3,374,684 A     3/1968 Greven
(Continued)

FOREIGN PATENT DOCUMENTS

CN      101180452 A      5/2008
CN      101310126 A      11/2008
(Continued)

OTHER PUBLICATIONS

Volmer, Johannes: Kurvengetriebe. 2. Auflage. Heidelberg : Dr. Alfred Huthig Verlag, 1989. 90, 91. Bild 5.17b).—ISBN 3-7785-1840-2. [Fachbuch].

(Continued)

*Primary Examiner* — Patrick Cicchino

(57) ABSTRACT

A linear actuator for driving an actuating member of an internal combustion engine of a motor vehicle, the linear actuator having two rolling bearings for scanning mutually opposing sides of a rib that is formed as a guide curve. The rib has a variable width, against which the two sensing bodies are biased to reduce or eliminate undesired reaction forces.

16 Claims, 4 Drawing Sheets

(51) Int. Cl.
*F16K 31/524* (2006.01)
*F16H 53/06* (2006.01)

(56) References Cited

U.S. PATENT DOCUMENTS

| | | |
|---|---|---|
| 3,685,364 A | 8/1972 | Turecek et al. |
| 8,490,605 B2 | 7/2013 | Gracner et al. |
| 8,803,388 B2 | 8/2014 | Keefover et al. |
| 9,188,088 B2 | 11/2015 | Eggler et al. |
| 10,054,084 B2 * | 8/2018 | Weis .................... F02M 26/52 |
| 10,180,181 B2 * | 1/2019 | Cao ........................ F16H 61/32 |
| 2006/0213292 A1 | 9/2006 | Thomas |
| 2013/0269664 A1 | 10/2013 | Park et al. |
| 2015/0159770 A1 * | 6/2015 | Foucaut ............... F16K 31/528 137/15.18 |

FOREIGN PATENT DOCUMENTS

| | | | |
|---|---|---|---|
| CN | 101861486 A | 10/2010 | |
| CN | 103348112 A | 10/2013 | |
| DE | 1535088 A1 | 10/1970 | |
| DE | 102008000346 A1 | 8/2009 | |
| DE | 102011109664 A1 * | 2/2013 | ....... F16K 31/52408 |
| FR | 2096472 A1 | 2/1972 | |
| JP | 2013221516 A | 10/2013 | |
| KR | 20100042779 A | 4/2010 | |
| KR | 1020130087381 A | 8/2013 | |
| WO | 2015055548 A1 | 4/2015 | |

OTHER PUBLICATIONS

German Office Action dated May 4, 2015 for corresponding German application 10 2014 222 413.6.
International Search Report and Written Opinion dated Nov. 2, 2015 from corresponding International Patent Application No. PCT/EP2015/075460.

* cited by examiner

LINEAR ACTUATOR

CROSS-REFERENCE TO RELATED APPLICATIONS

This application claims the benefit of PCT Application PCT/EP2015/075460, filed Nov. 2, 2015, which claims priority to German Application DE 10 2014 222 413.6, filed Nov. 3, 2014. The disclosures of the above applications are incorporated herein by reference.

FIELD OF THE INVENTION

The invention concerns a linear actuator for driving an actuating member, in particular of an internal combustion engine of a motor vehicle, with a rotatable drive shaft and an axially displaceable ram for adjusting the actuating member, with a guide curve driven by the drive shaft about a rotary axis and with a guide member scanning the guide curve. The guide member has two sensing bodies, and the sensing bodies are pretensioned against opposite sides of the guide curve.

BACKGROUND OF THE INVENTION

Such linear actuators are used for example by exhaust gas recirculation valves in internal combustion engines of modern motor vehicles. The pretensioning of two sensing bodies against opposite sides of the guide curve serves to guarantee a play-free drive of the ram. The advantage of the known linear actuator is that the guide curve may be configured almost arbitrarily, and for example allow non-linear characteristic curves between the rotary angle of the drive shaft and the travel of the ram.

However, in particular for non-linear characteristic curves, the problem exists that undesirable reaction forces occur between the sensing bodies and the guide curve. These reaction forces must be absorbed by a spring element which pretensions the sensing bodies against the opposite sides of the guide curve. The reaction forces and the spring forces lead to mechanical loads and uneven force-travel curves of the linear actuator, and are therefore undesirable.

SUMMARY OF THE INVENTION

The invention is based on the problem of refining a linear actuator of the type cited initially, so that it avoids undesirable reaction forces.

This problem is solved according to the invention in that the width of the guide curve is configured so as to be variable.

With this design, a play-free guidance of the ram may be achieved even for non-linear characteristic curves. An even force-travel curve is achieved by the corresponding design of the width of the guide curve. Thanks to the invention, the guide curve may have a different width close to the rotary axis than remote from the rotary axis. Thus, the linear actuator may have a progressive characteristic curve of the rotary angle of the rotary axis to the travel of the ram. The forces on the drive shaft remain constant over the rotary angle. The width of the guide curve is designed such that the spacing of the sensing bodies and hence also the pretension forces always remain constant over the entire rotary angle of the rotary axis. Thus undesirable reaction forces are avoided.

According to another advantageous refinement of the invention, particularly even force-travel curves can easily be achieved if the width of the guide curve is configured so as to change continuously over the entire travel of the ram.

According to another advantageous refinement of the invention, the force-travel curve is smoothed out further if the guide curve is narrower in a portion arranged close to the rotary axis than in a portion remote from the rotary axis. Preferably, the difference in width of the portions of the guide curve is around 0.1 to 0.2 mm.

If a connecting line of the sensing bodies precisely aligns with the rotary axis, during driving of the drive shaft, transverse forces are generated which are transmitted to the ram. According to another advantageous refinement of the invention, such transverse forces can easily be avoided if a connecting line of the sensing bodies is offset relative to the rotary axis. Preferably, the offset of the connecting line is around 1 mm.

According to another advantageous refinement of the invention, a play in the sensing bodies on the guide curve during drive of the ram, caused by temperature fluctuations for example, can easily be avoided if the guide member has a spring element for pretensioning the sensing bodies towards each other or away from each other.

The guide curve could for example be configured as a groove, and the sensing bodies pretensioned against the wall of the groove. This however requires a particularly wide groove or very small sensing bodies. For actuating members for components of an internal combustion engine, however, the installation space is very limited. In particular, however, linear actuators provided for internal combustion engines of motor vehicles have a particularly high stability in a limited installation space if the guide curve has a protruding rib and the sensing bodies lie against opposite sides of the rib.

According to another advantageous refinement of the invention, lateral loads and tipping moments in the linear actuator may be kept particularly low if the sensing bodies each comprise a roller bearing.

According to another advantageous refinement of the invention, a proposed translation of the linear actuator may easily be set if the guide curve is arranged on a disc extending over a part circle, if the disc has a partial toothed rim on its periphery and a pinion driven by the drive shaft meshes with the partial toothed rim, and if the sensing bodies are connected to the ram of a valve body.

According to another advantageous refinement of the invention, the linear actuator may be constructed particularly simply if the spring element is configured as a stirrup-shaped spring plate connecting the two sensing bodies together.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention allows numerous embodiments. To further clarify its basic principle, one of these is depicted in the drawing and described below. The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
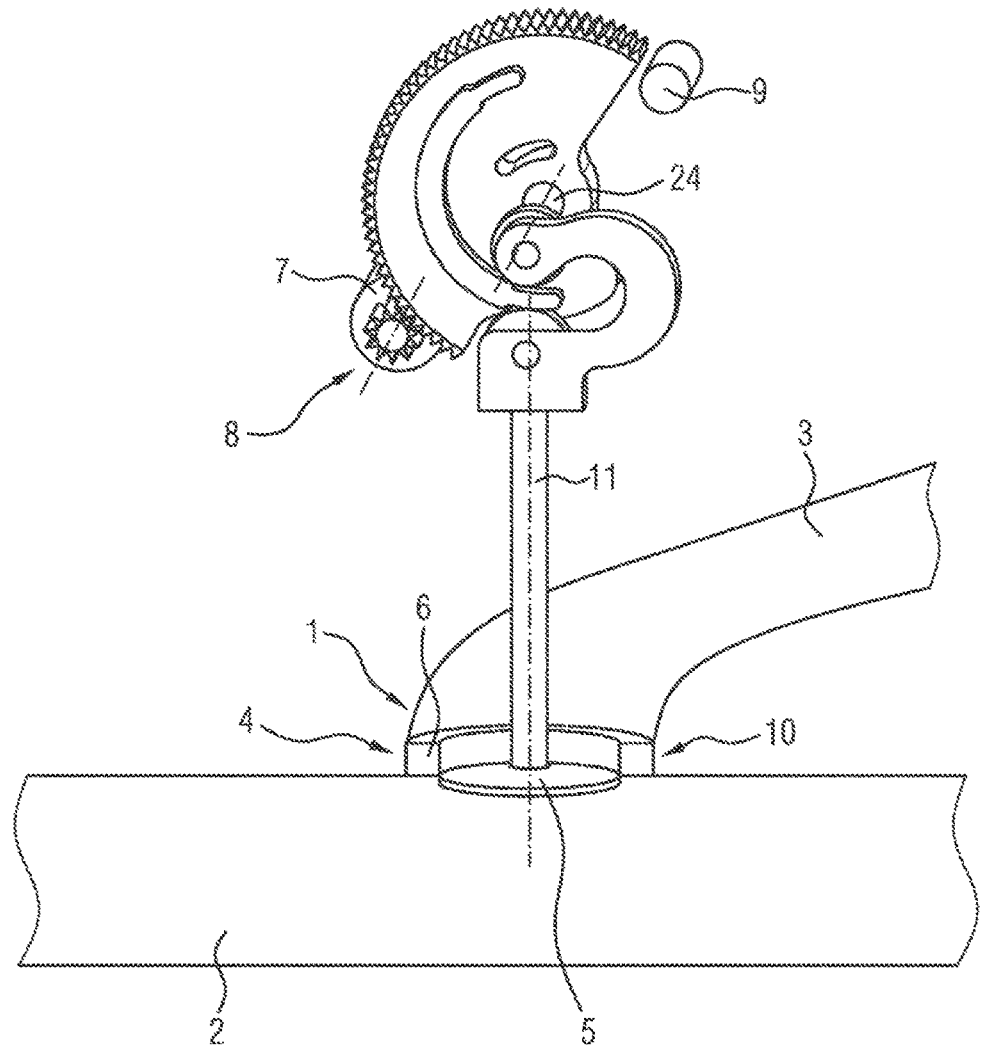
FIG. 1 is a perspective view of a linear actuator with adjacent components of an actuating member, according to embodiments of the present invention.

FIG. 1 shows an exhaust gas recirculation valve 1 of a motor vehicle, with an exhaust gas channel 2 and a recirculation channel 3. The exhaust gas recirculation valve 1 has an actuating member 4 with a valve body 5 and a valve seat 6. A linear actuator 8 driven by an electric motor 7 serves to drive the actuating member 4. The linear actuator 8 has a fixed stop 9 and a second soft stop 10. The second stop 10 is formed by the valve seat 6 against which the valve body 5 lies.

The linear actuator 8 has a ram 11 for driving the valve body 5.

Figure 2:
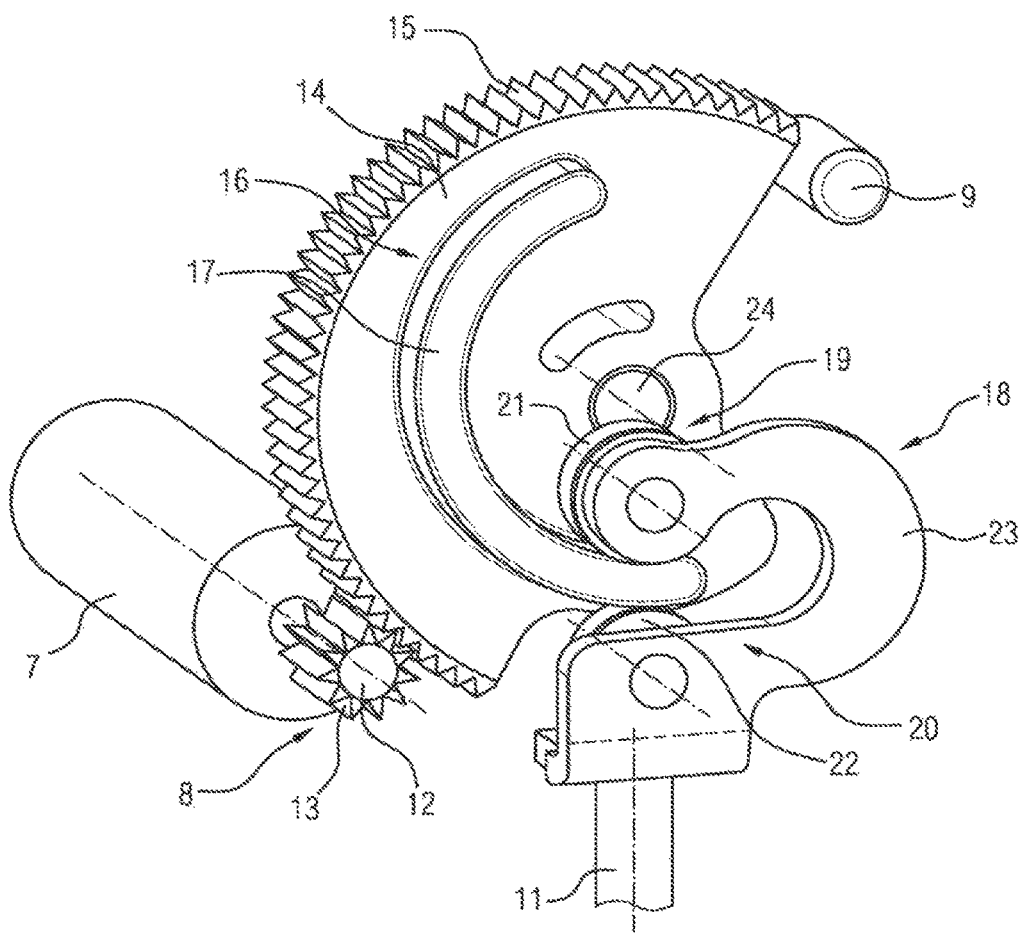
FIG. 2 is an enlarged, perspective view of a linear actuator, according to embodiments of the present invention.

FIG. 2 shows a perspective, enlarged view of the linear actuator 8 from FIG. 1. It is noted here that the electric motor 7 drives a drive shaft 12 with a pinion 13. The linear actuator 8 has a disc 14 extending over a partial circle, with a partial toothed rim 15 arranged on the periphery. The disc 14 is mounted rotatably about a rotary axis 24. The pinion 13 drives the disc 14 via the partial toothed rim 15. A guide curve 16 with a rib 17 is arranged on the disc 14. A guide member 18 scanning the guide curve 16 has two mutually opposing sensing bodies 19, 20. The sensing bodies 19, 20 each comprise a roller bearing 21, 22 configured as a ball bearing, and are connected together via a spring element 23. The spring element 23 is formed stirrup-shaped and is made of spring steel. Furthermore, the spring element 23 is connected to the ram 11.

By rotation of the disc 14 about the rotary axis 24 by driving by the electric motor 7, the roller bearings 21, 22 of the sensing bodies 19, 20 roll along the rib 17 of the guide curve 16. The guide member 18 is moved up and down according to the form of the guide curve 16. This movement is transmitted via the ram 11 to the valve body 5, which finally opens or closes the exhaust gas recirculation valve 1.

Figure 3:
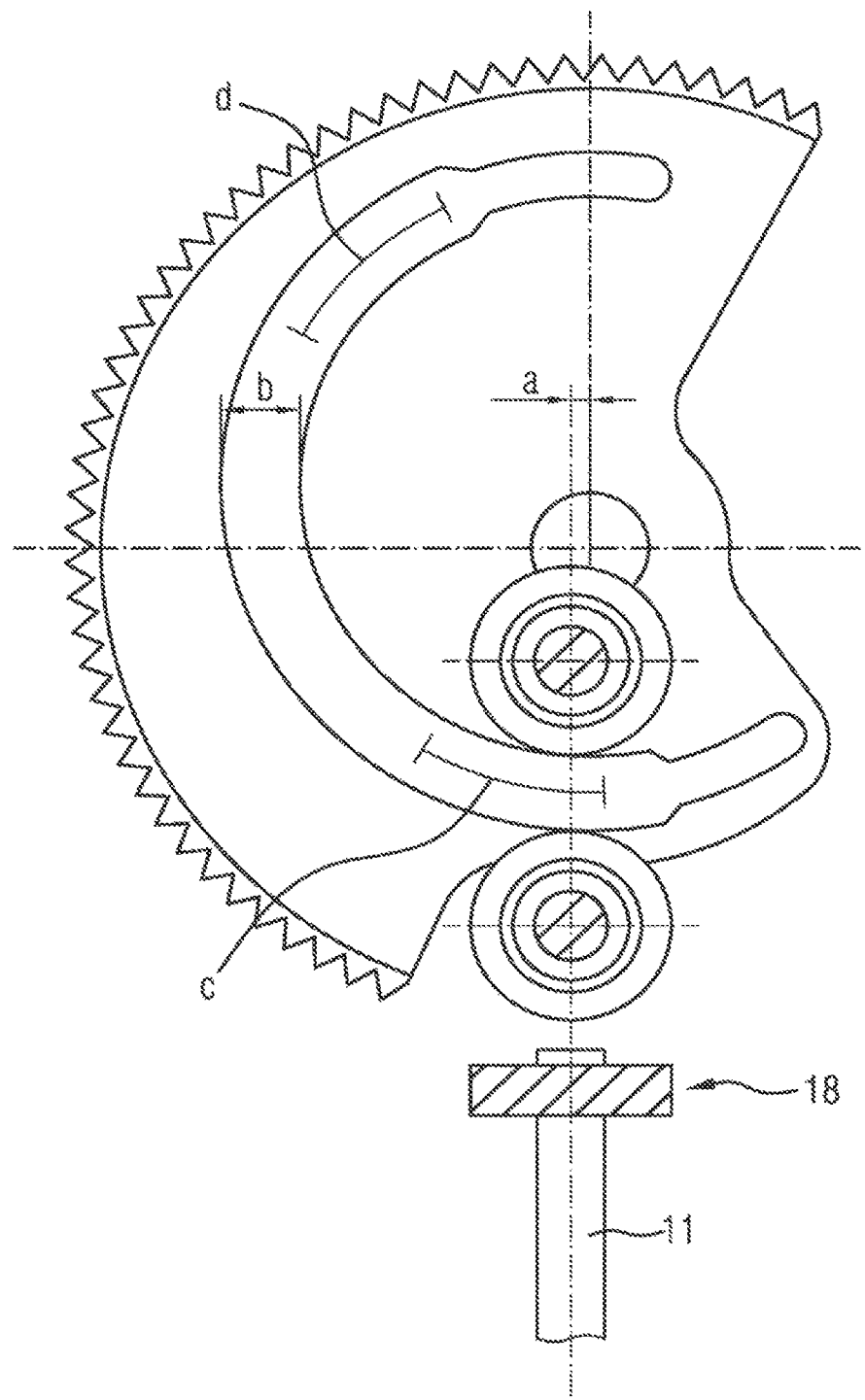
FIG. 3 is a partial sectional view taken through a guide member of a linear actuator, according to embodiments of the present invention.

FIG. 3 shows the linear actuator 8 in a cross-sectional depiction through the guide member 18. Due to the cross-sectional depiction, the sensing bodies 19, 20 with the spring element 23 connecting the ram 11 from FIG. 2, are not shown. It is evident here that the ram 11 aligns with contact points of the two sensing bodies 19, 20 on the rib 17. However, the contact points of the two sensing bodies 19, 20 on the rib 17 do not align with the rotary axis 24 of the disc 14 and hence the rotary axis 24 of the guide curve 16. The rotary axis thus has an offset a to the connecting line of the sensing bodies 19, 20. Thus the ram 11 also has the same offset a to the rotary axis 24 of the rib 17. The width b of the rib 17 reduces continuously over the entire travel of the ram 11. For this, the guide curve 16 has a portion c arranged close to the rotary axis 24, and a portion d remote from the rotary axis 24. The rib 17 is narrower in the portion c arranged close to the rotary axis 24 than in the portion d remote from the rotary axis 24.

Figure 4:
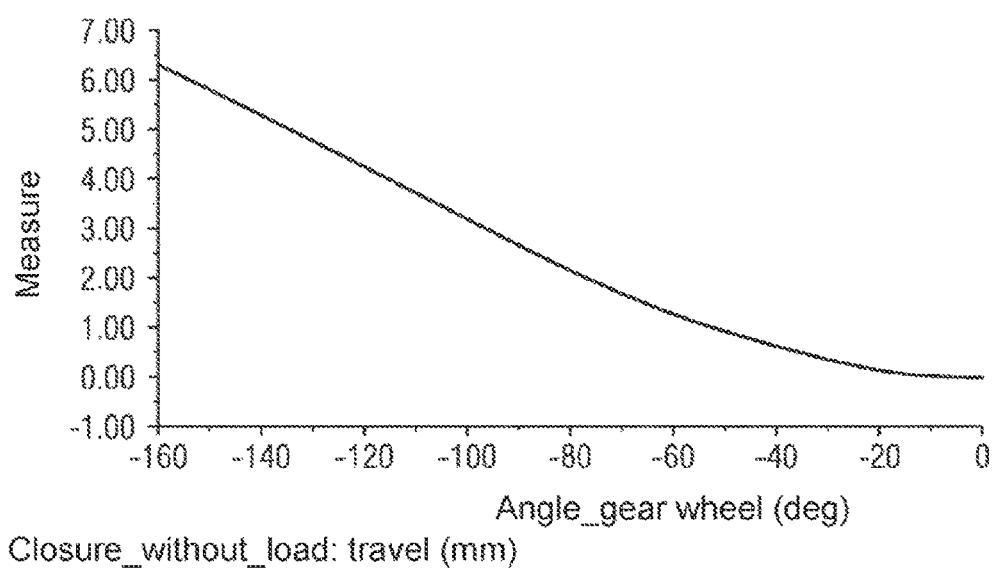
FIG. 4 is graph depicting a characteristic curve of the operation of a linear actuator, according to embodiments of the present invention.

FIG. 4 shows for clarification a progressive curve of the travel of the ram 11 over the rotary angle of the rotary axis 24.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A linear actuator for driving an actuating member for an internal combustion engine of a motor vehicle, the linear actuator comprising:
   an actuating member;
   an axially displaceable ram for changing the configuration of the actuating member;
   a guide curve selectively rotated about a rotary axis, and the guide curve is narrower in a portion arranged close to the rotary axis, than in a portion remote from the rotary axis;
   a guide member connected to the axially displaceable ram, the guide member being movable along the guide curve; and
   a plurality of sensing bodies, the plurality of sensing bodies being part of the guide member, at least two of the plurality of sensing bodies being pretensioned against opposite sides of the guide curve;
   wherein the width of the guide curve is variable, such that the axially displaceable ram changes the position of the actuating member as the axially displaceable ram and the guide member are moved by the guide curve.

2. The linear actuator of claim 1, wherein the width of the guide curve is configured so as to change continuously over the entire travel of the axially displaceable ram.

3. The linear actuator of claim 1, further comprising a connecting line of the sensing bodies, wherein the connecting line is offset relative to the rotary axis.

4. The linear actuator of claim 1, the guide member further comprising a spring element, wherein each of the plurality of sensing bodies are connected to the spring element.

5. The linear actuator of claim 4, wherein the spring element pretensions at least two of the plurality of sensing bodies towards each other.

6. The linear actuator of claim 4, the spring element further comprising a stirrup-shaped spring plate, wherein the plurality of sensing bodies are connected to the stirrup-shaped spring plate.

7. The linear actuator of claim 1, the guide curve further comprising a protruding rib, wherein at least two of the plurality of sensing bodies are positioned to be in contact with opposite sides of the rib.

8. The linear actuator claim 1, each of the plurality of sensing bodies further comprising a roller bearing.

9. The linear actuator of claim 1, further comprising:
   a semi-circular disc, the guide curve being arranged on the semi-circular disc;
   a partial toothed rim formed on the periphery of the semi-circular disc; and
   a pinion in mesh with the partial toothed rim;
   wherein the pinion is selectively driven for rotation by the shaft of an electric motor, and the rotation of the pinion rotate the semi-circular disc.

10. The linear actuator of claim 1, further comprising a valve body connected to the axially displaceable ram, wherein the position of the valve body changes based on the position of the axially displaceable ram.

11. A linear actuator, comprising:
a semi-circular disc;
a guide curve mounted to the semi-circular disc, the guide curve selectively rotated about a rotary axis, and the guide, curve is narrower in a portion arranged close to the rotary axis than in a portion remote from the rotary axis;
a protruding rib, the protruding rib being part of the guide curve;
a guide member, the guide member scanning the guide curve; and
a plurality of sensing bodies, the plurality of sensing bodies being part of the guide member, at least two of the plurality of sensing bodies being pretensioned against opposite sides of the protruding rib;
wherein the width of the guide curve is variable, such that the position of the guide member changes based on the shape of the guide curve and the rotation of the guide curve about the rotary axis.

12. The linear actuator of claim 11, further comprising:
an actuating member operable for controlling a flow of exhaust gas; and
an axially displacable ram connected to the guide member and the actuating member;
wherein as the guide member is moved by the guide curve, the axially displaceable ram changes the configuration of the actuating member.

13. The linear actuator of claim 11, wherein the width of the guide curve is configured so as to change continuously over the entire travel of the ram.

14. The linear actuator of claim 11, further comprising:
a plurality of teeth formed on the periphery of the semi-circular disc; and
a pinion in mesh with the plurality of teeth;
wherein the pinion is selectively driven for rotation by the shaft of an electric motor, such that the semi-circular disc rotates as the pinion is rotated.

15. The linear actuator of claim 11, the guide member further comprising a spring element, wherein each of the plurality of sensing bodies are connected to the spring element.

16. The linear actuator claim 15, each of the plurality of sensing bodies further comprising a roller bearing.

* * * * *